Figure 1:
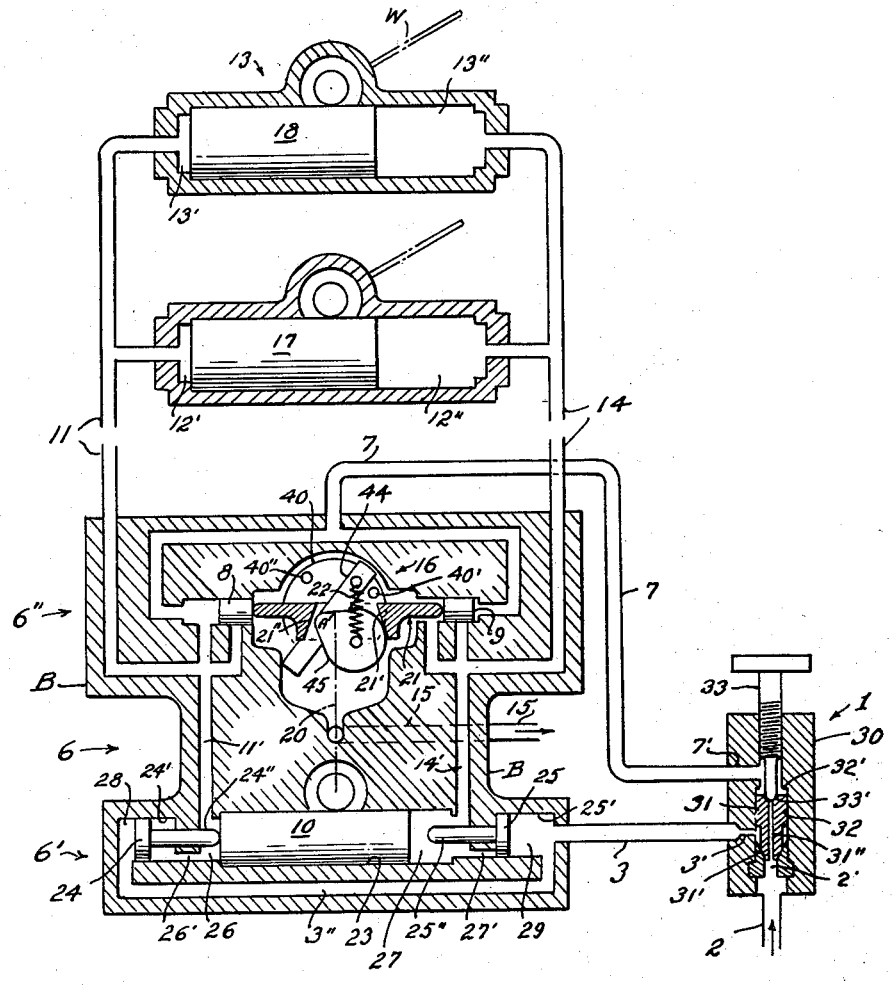

May 3, 1960 L. J. MOULTON ET AL 2,935,050
HYDRAULIC ACTUATOR SYSTEMS FOR RECIPROCATING
FLUID OPERATED MOTORS
Filed March 25, 1957 3 Sheets-Sheet 1

INVENTORS
L. J. MOULTON
R. L. DANGLER
BY George M. Soule
ATTORNEY

May 3, 1960 L. J. MOULTON ET AL 2,935,050
HYDRAULIC ACTUATOR SYSTEMS FOR RECIPROCATING
FLUID OPERATED MOTORS
Filed March 25, 1957 3 Sheets-Sheet 2

INVENTORS
L.J. MOULTON
R.L. DANGLER
By Geo. M. Soule
ATTORNEY

United States Patent Office 2,935,050
Patented May 3, 1960

2,935,050

HYDRAULIC ACTUATOR SYSTEMS FOR RECIPROCATING FLUID OPERATED MOTORS

Lloyd Jackson Moulton, Mentor, and Robert L. Dangler, Shaker Heights, Ohio, assignors to Curtiss-Wright Corporation, a corporation of Delaware Application March 25, 1957, Serial No. 648,007

8 Claims. (Cl. 121—150)

This invention relates to an improved fluid control and actuator system for reciprocating, fluid operated motors such for example as are commonly used for driving windshield wipers on aircraft. One object of the invention is to provide a fluid control or automatic actuator system for one or more reciprocating motors wherein the fluid supply pressure for motor operation can vary over an extremely wide range without adversely affecting the desired cycling or automatic fluid path reversing operations in respect to the motor pressure chambers.

With generally increasing aircraft speeds, the air loads on the wiper blades and drive arms have increased, demanding proportionate increase in wiper drive arm torque. When hydraulically operated aircraft wiper mechanisms are employed it is desirable to enable the use therein of maximum available fluid system pressure for high torque output at high flight speeds. Hydraulic fluid supply system pressures in aircraft, however, vary greatly, e.g. become less with increased demands on the system as during take off, climb and during preparation for landing; and trouble free wiping operations, but usually at relatively low torque requirements as compared to that required during high speed flying, are critically needed at such times.

When two or several hydraulic wiper motor devices are required on a single aircraft, as is usual, then suitably light weight hydraulic wiper system installations, manually controllable at one point for start, speed adjustment annd shutdown, can be most effectually arranged to include a single fluid pressure operated actuator or automatic cycling mechanism unit connected to serve the necessary plurality of reciprocating motor or window units respectively arranged to operate individual wiper drive arms. In such installations the automatic cycling or rerouting of fluid pressure and exhaust in respect to the motors at the end of each wiping stroke is arranged to result from pressure signals transmitted via the operating fluid from the motors to the actuator unit either when both or all of the wipers have reached the ends of their normal wiping strokes or when operatingly similar conditions occur as through blockage of normal stroke action by ice accumulations on the surface or surfaces being wiped. When such conditions occur the resultant wiper motor operating pressure rises sharply, causing, for example, operation of a spring loaded cycling mechanism in the actuator unit for rerouting of fluid to commence new strokes.

When widely varying aircraft hydraulic system pressures are apt to obtain and when varying torque demands must be satisfied, the heretofore available wiper equipment of the above outlined type known to us becomes inadequate in that, assuming the actuator cycling mechanism spring loading is designed or set for effectual operation at relatively low motor supply pressures, the actuator mechanism is then almost certain to cycle prematurely at such times as maximum system pressures are needed and made available to the motors for the wiping operations. For illustration, a severely high air load on the exposed parts of the wiper installation, when high or maximum system pressure is being used for high torque operation, can produce the above mentioned signal and initiate cycling at partial stroke or other undesired positions of the wipers or can produce ineffectual repeated recycling at completion of a down wind stroke but without initiating a new stroke against high air load.

The present invention, among other desirable features which will be explained, provides a relatively low weight fluid operated wiper mechanism and control system whereby the wiper motor or motors can be operated at whatever torque output is necessary under varying flying conditions and wherein the automatic reversing valve or cycling means will function dependably despite large or sudden variations in fluid system supply pressure and wherein the motor operating pressure is enabled closely to approach the system pressure despite variations therein, in accordance with characteristically different operations of the aircraft as explained above, before reversing takes place. Further the present mechanism and system, when arranged to control a plurality of independently operable wiper motors, automatically resynchronizes the motors through fluid action thereon whenever, as through unequal loading, the motors get out of step with each other.

Figure 2:
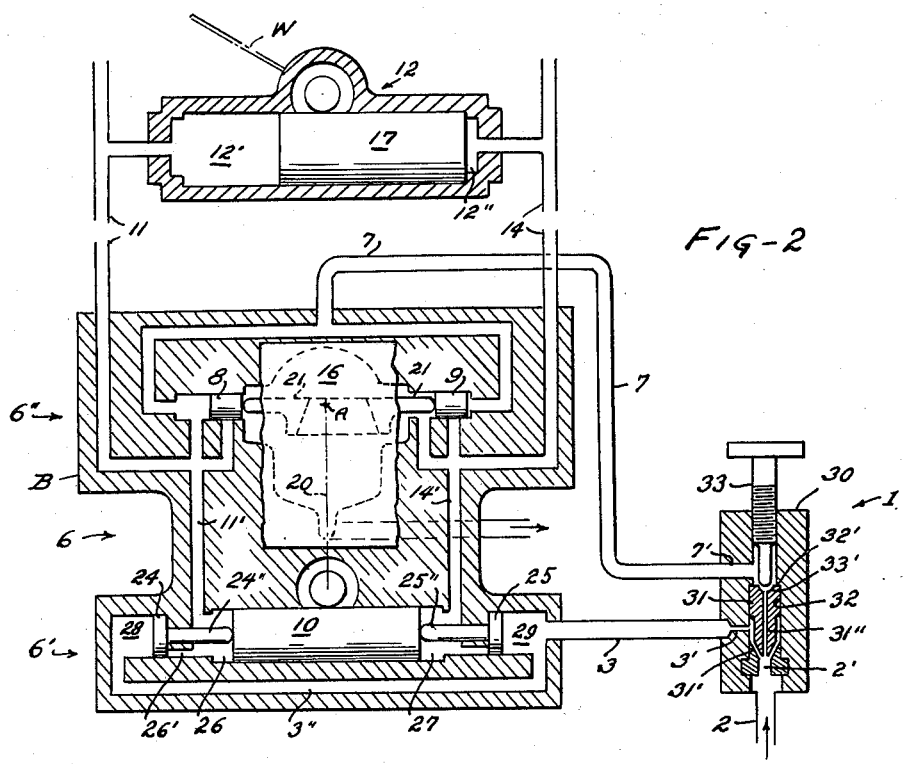
Figure 3:
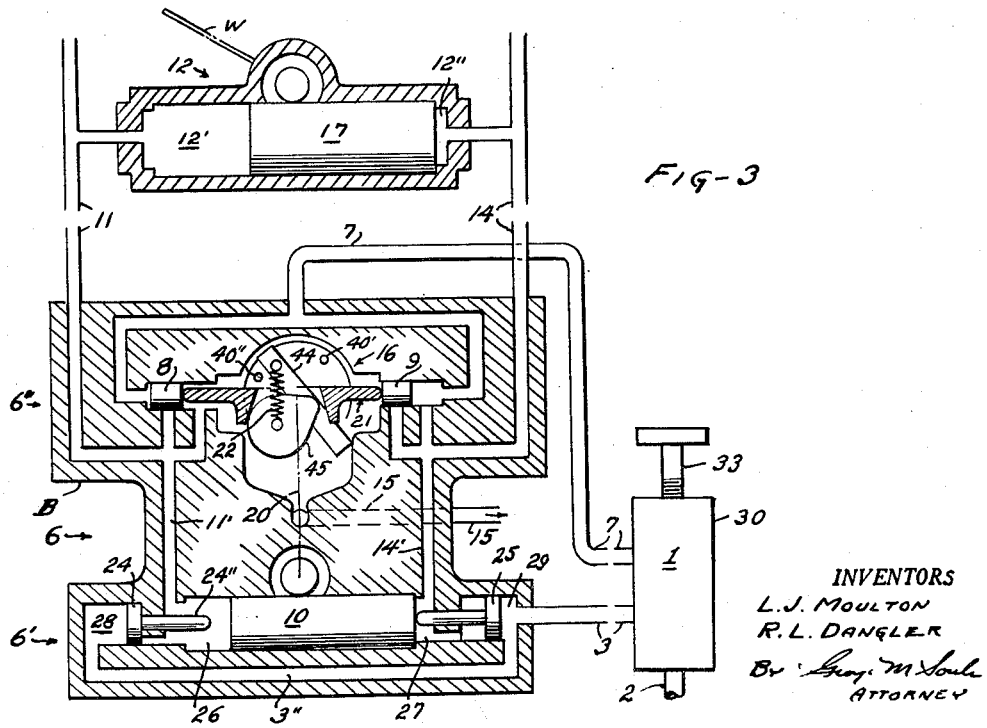
Figure 4:
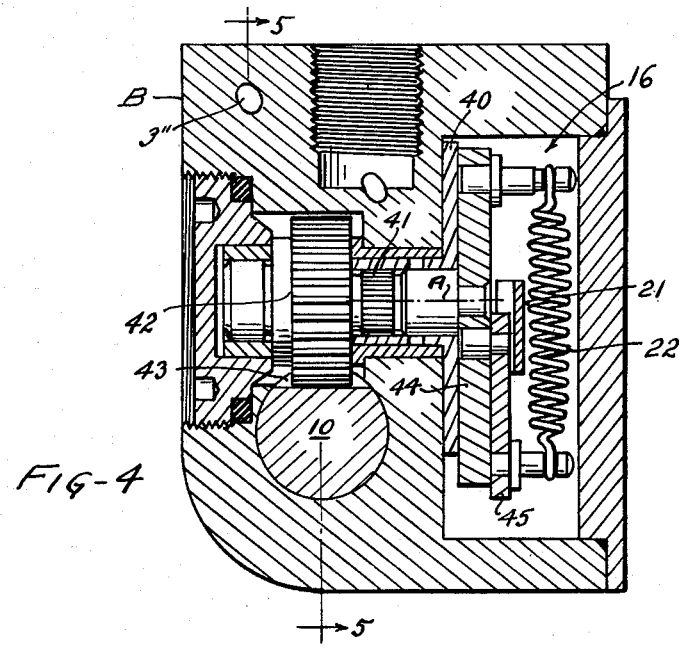
Figure 5:
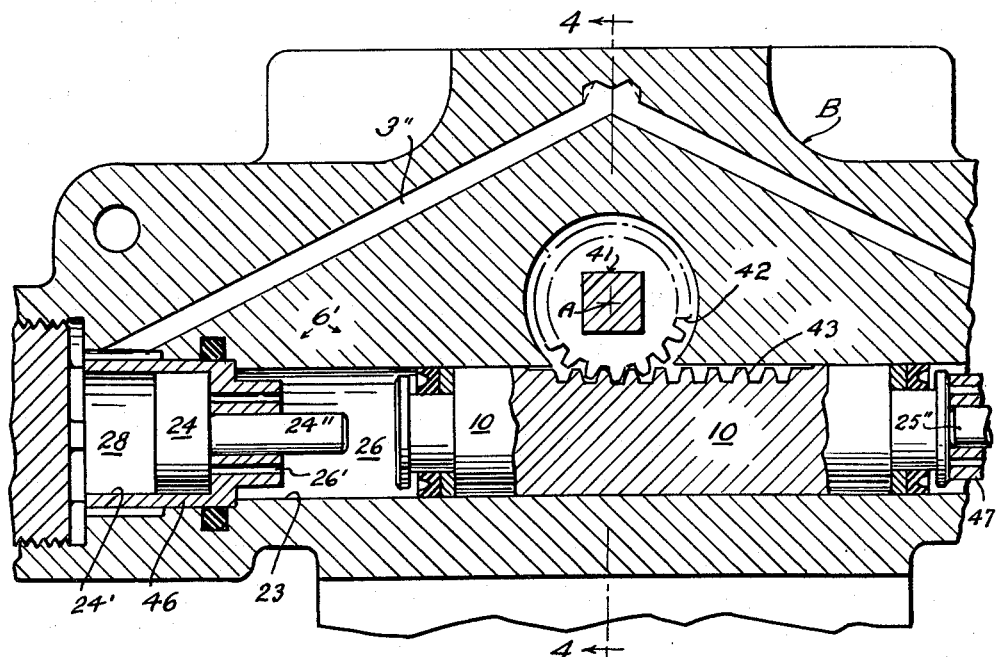

In the drawings, Figs. 1 through 3 are hydraulic circuit diagrams or schematic views showing the preferred principal mechanisms comprising the present system in relatively different stages of operation. Fig. 4 is a transverse sectional view of a physical embodiment of the actuator and reversing or direction control valve mechanism. Fig. 5 is a longitudinal sectional detail view taken along the line 5—5 on Fig. 4 showing particularly a preferred construction of a reversing piston and cooperating pressure balancing pistons.

General arrangement

In Figs. 1 to 3, a manually operable master control valve or valve unit 1 receives aircraft system fluid supply through conduit 2, and has two sequentially opened discharge conduits 3 and 7 for the fluid. Conduit 3, when valve 1 is initially opened, connects system pressure fluid directly to a main actuator and balancing piston mechanism 6' of the present fluid actuator unit 6. Metering fluid conduit 7 leads from valve 1 to a fluid reversing or direction control valve mechanism 6" of actuator unit 6 which valve mechanism 6", upon further opening of the control valve 1, directs metered working fluid alternately through conduits 11 and 14 to reciprocating wiper-operating motors 12 and 13 connected in parallel with the actuator mechanism 6 as is more or less self evident from Fig. 1.

A main actuator or reversing piston 10 of mechanism 6', as shown, actuates the direction control valve mechanism 6" by operating a spring loaded snap action or toggle mechanism 16 to which the piston 10 is suitably mechanically connected as indicated diagrammatically in Fig. 1 principally by dot-and-dash line 20.

The toggle mechanism 16, as shown diagrammatically in Fig. 1 (further shown in Fig. 4) is essentially the same in operation as the toggle mechanism of U.S. Patent 2,451,449 issued October 12, 1948.

When the reversing piston 10 is moved by pressure fluid in the actuator system to either of its two extreme positions which are illustrated in Figs. 1 and 3 respectively, a valve operating rod 21 of the toggle mechanism will have caused or permitted movement of direction control valve plungers 8 and 9 into one of their two illustrated positions relative to associated parts, or as shown by comparison of Figs. 1 and 3, in each of which position application of metered fluid pressure through conduit 7 and conduits 11 or 14 will cause commencement of new strokes on part of wiper motor pistons 17 and 18. Toggle spring 22 and associated parts, as described in said patent, hold the valve control rod 21 in the two illustrated positions until re-cycling occurs and the toggle mechanism has a "hammer blow" action in shifting the valve plungers from one position to another.

Balancing piston mechanism

The reversing piston 10 of actuator unit 6 (portion 6') is freely slidable in a cylindrical bore 23 of the actuator unit body B between appropriate limit shoulders, and the relatively opposite ends of the bore 23 form wiper motor signal pressure receiving chambers 26 and 27. These chambers communicate freely, as through passages 26' and 27', respectively with the relatively inner ends of additional bores 24' and 25' in general alignment with the bore 23 and, as shown, the bores 24' and 25' are of equal diameter somewhat smaller than the diameter of bore 23. The balancing pistons 24 and 25, at their relatively remote ends, are subjected to the variable system supply pressure, from conduit 3, or a function of supply pressure proportional thereto, in respective pressure chambers 28 and 29, shown interconnected at 3". The balancing pistons 24 and 25 have suitably guided rod portions 24" and 25" respectively for abutment with shoulders (e.g. associated end surfaces) of reversing piston 10. The axial, relatively near surfaces of the balancing pistons 24 and 25 (oppositely of the surfaces which are exposed to system supply pressure) are subjected, alternately, through reversing valve action to wiper motor signal pressure (e.g. motor operating pressure or a function thereof) in the chambers 26 and 27 and connected chamber spaces, as clearly shown, and to negligible or exhaust pressure.

The balancing piston rods 24" and 25" are of such length in relation to illustrated limiting shoulders which stop the motion of the balancing pistons toward the reversing piston 10, and relative to the abutment shoulders of piston 10, that when, for example, as shown at the right in Fig. 1, one balancing piston (see piston 25) is moved inwardly to its stopped position by supply system pressure it can arrest the reversing piston 10 in partial stroke position (see Fig. 2, piston 25) and temporarily restrain the reversing piston 10 from effecting the necessary movement to trip the toggle mechanism 16 past dead center.

Direction control valve mechanism

In the direction control valve system (mechanism 6" as shown), when the valve plungers 8 and 9 are in their Fig. 1—illustrated positions, the metered fluid conduit 7 is connected to reversing valve chamber 26 and to chambers 12' and 13' of the wiper motors 12 and 13. In that position of the direction control valve plungers 8 and 9, motor chambers 12" and 13" and the reversing piston chamber 27 are connected to a fluid return passage 15, shown below the toggle mechanism 16, for exhaust of fluid from wiper motor chambers 12" and 13". In the relatively reversed position of the direction control valve plungers 8 and 9 (see Fig. 3), the metered pressure fluid is admitted from conduit 7 to the wiper motor chambers 12" and 13" and to the reversing piston chamber 27, and the correspondingly opposite portions of the system are connected to the exhaust or fluid return passage 15.

Master control valve

The master control and metering valve 1, as shown schematically in Fig. 1, comprises a body 30 with fittings, not shown, for connection of aircraft system pressure fluid at passage 2'. The body 30 is similarly arranged for connection at 3' in order to supply system pressure fluid to balancing piston chambers 28 and 29, and, as at 7' for admission of metered fluid supply to conduit 7. A floating plug 31 slidable in a bore 32 of body 30 closes the main supply passage 2' from communication with passages 3' and 7' when the manually operable threaded stem 33 is in its illustrated fully shut off position. As a stem 33 is raised, the first operation is to admit fluid to the passage 3' past the valve seating surfaces 31' to charge the interconnected chambers 28 and 29 of the balancing pistons 24 and 25, and meanwhile the incoming system supply pressure causes the floating plug 31 to follow the stem 33 and maintain a lower end valve plug portion of the stem seated in closing relation to an axial bore 31" of the floating plug. Further upward or opening movement of the valve stem 33 (see Fig. 2), permits the floating plug 31 to become arrested by a stop shoulder 32' in bore 32, whereupon still further upward movement of the stem (also shown in Fig. 2) opens the axial passage 31" to communication with the passage 7' and conduit 7 for wiper motor speed controlling metering of fluid to the wiper motors via the direction control valve mechanism 6".

Operation

The main actuator or reversing piston 10 of mechanism 6, as already indicated, is moved from one extreme position (Fig. 1) toward its other extreme position (Fig. 3) by metered pressure fluid in conduits 11, 11' or conduits 14, 14' respectively, acting on the wiper motor pistons 17 and 18, as soon as the toggle mechanism 16 has caused reverse of the working positions of reversing valve plungers 8 and 9 relative to their associated valve ports, or as shown for example by comparison of Figs. 1 and 3. Full stroke movement of piston 10, however (i.e. sufficient to cause complete toggle action of mechanism 16), is temporarily restrained by the operation of balancing pistons 24 and 25 through abutment of their respective rods 24" and 25" with coacting relatively opposed abutment surfaces of piston 10, until both of the wiper motor pistons 17 and 18 have completed their normal possible stroke movements or until both of the motor pistons have been otherwise mechanically blocked against movement in the directions in which they have been moving. The restraining action of one of the balancing pistons 24 and 25 continues (e.g.) until the metered fluid pressure acting upon motor pistons 17 and 18 has increased toward and has nearly reached the then existing maximum available supply system pressure which at all times during wiper motor operation is being applied to both balancing pistons 24 and 25 in their associated chambers 28 and 29.

The just above described restraining action on part of balancing pistons 24 and 25 will be readily understood by comparison of Figs. 1, 2 and 3 if it is assumed that, in Fig. 1, the direction control valves 8 and 9 have been previously reversed, that system pressure is about to commence to be applied in balancing piston chamber 28 to the left face of balancing piston 24, and that metered fluid pressure will presently build up in conduits 11 and 11' (opposite conduits 14 and 14' and pressure chamber 27 now conditioned for exhaust), so as to commence moving of wiper motor pistons 17 and 18 and moving of reversing piston 10 toward the right. Left hand balancing piston 24 moves rightwardly to its stopped position (Fig. 2) forcing piston 10 ahead of it, and piston 10, same view, moves further to the right by metered fluid action on its left face until the movement is stopped by the rod 25" of balancing piston 25. In that stopped position of piston 10, the toggle mechanism 16, depending upon its design, may have commenced to be turned in the direction to operate the direction reversing valves 8 and 9 to reversed position (Fig. 3), but the supply system pressure in balancing piston chamber 29, then being higher than pressure elsewhere in the present mechanism, acts, through the associated balancing piston 25, to prevent occurrence of toggle action past dead center. Depending now upon the effective area of piston 10 in its left hand chamber 26 (subjected to wiper motor operating metered pressure) as related to the effective area of piston 25 (subjected to the normally higher system pressure and augmented to some extent by the toggle spring force in opposing further rightward movement of piston 10) the further rightward movement of piston 10 cannot occur until the pressure acting upon the left face of piston 10 has been increased (e.g. due to arrest of motor pistons 17 and 18) sufficiently to overcome both opposing forces. The area of piston 25 in chamber 29 is preferably only sufficiently less than the area of piston 10 in chamber 26 so that toggling past dead center on part of mechanism 16 will occur at nearly the point at which wiper motor operating pressure will have balanced the then existing supply system pressure. It is apparent from the above that upward variations in supply system pressure from an assumed effectual base can have little or no effect on cycling or automatic reversing action and that the system pressure can be depleted and still effect proper cycling providing it remains adequate to operate the wiper motors and to overcome toggle spring resistance in the relative position of the actuator parts illustrated in Fig. 2.

Since the hydraulic circuit and actuator mechanism is bisymmetrical about the vertical center line of the toggle mechanism 16 (e.g. along broken line 20, Fig. 1) the leftward stroke portion of the complete operating cycle is, of course, the same as just described; and reciprocating operation of the wiper motors 17 and 18 will continue automatically as long as the metered pressure in conduit 7, as adjusted for wiper speed control by the manually operated valve 1, is sufficient to overcome whatever leakage there might be in the actuator unit or past the wiper motor pistons or until the master control valve 1 is operated to close the axial passage 31" in floating plug 31. By slowly closing the master control valve, the wipers can be parked at either desired ends of their motor strokes.

Wiper synchronization

When the present actuator system is arranged to operate two or several window unit motors, as illustrated by the parallel connected motors 12 and 13, the motor pistons are apt to require synchronization at intervals. With the wiper motor units free to operate more or less independently of each other, one of the wipers may be blocked as in mid stroke by an obstruction such as ice, and when that occurs it is desirable for the other wiper motor or motors to complete its or their stroke or strokes before recycling occurs, and that the blocked wiper be returned to try again as promptly as possible. If the wiper blade W, which is connected to one of the motors 12 and 13 hereof as schematically shown, is stopped by such obstruction, the other blade will continue moving until it is also obstructed or until it reaches the end of its full stroke. In either case buildup in fluid pressure, as described, causes cycling or reversal of stroke when neither blade can proceed further; and the wiper which was prematurely stopped will then be first to return to initial position and there wait for completion of stroke by the other wiper. Then the two start new strokes simultaneously. In that manner the two wipers will be re-synchronized, when necessary, at the end of each concurrently completed stroke.

Figs. 4 and 5

The toggle mechanism 16, as partially shown in Fig. 1, is further shown at the right in Fig. 4. A circular drive plate or disc 40 in body member B is connected by a suitable shaft assembly 41 to a toothed pinion 42 in mesh with teeth 43 of the rack portion of reversing piston 10. Plate 40 on the shaft assembly, through angularly spaced pins 40' and 40" of the plate thereby imparts motion of the piston 10 to a toggle bar or link 44 independently and freely pivoted on the axis, A, Fig. 4, of shaft assembly 41. Link 44 has a cam 45 pivoted thereto, eccentrically of axis A, for engagement, alternately, with relatively opposed abutment surfaces 21' and 21" of the directional control valve operating rod 21. Toggle spring 22 is connected to pins on the bar or link 44 and cam 45, as clearly shown by comparison of Figs. 1 and 4. The toggle mechanism has sufficient lost motion (between cam 45 and operating rod surfaces 21' and 21"), for percussion action on the valve control rod 21 in moving the valve plungers 8 and 9 from each illustrated position into the relatively opposite position.

In Fig. 5, the bore 23 (cf. Fig. 1) in body member B containing the reversing piston 10, is shown with sleeves 46 and 47 in which the bores 24', 25' for the pressure balancing pistons 24 and 25 and the passages for communication of the bores 24' and 25' with pressure chambers 26 and 27 are formed. Fig. 5 shows appropriate leakage-obstructing seals between the various elements, as preferably arranged. The other parts, as shown in Figs. 4 and 5, are believed to be self evident from inspection of those views.

We claim:

1. In combination with a reciprocating, fluid operated motor having two pressure chambers and an output member arranged for limited stroke operation in relatively opposite directions by pressure fluid in respective chambers, a supply source of operating fluid subject to variations in pressure, an automatic direction control valve means between the source and the motor arranged to apply fluid from said source alternately to the motor pressure chambers, the valve means including pressure responsive actuating means connected to said source and operative, as a function of rise in pressure in either one of the motor pressure chambers at terminal stroke of the motor output member, in a direction to cause rerouting of the supply pressure fluid to the other one of the chambers, pressure responsive means independently connected to said source and operated as a function of supply source pressure and connected to oppose and prevent operation of the actuating means until pressure in the then effective motor chamber at terminal stroke of the output member of the motor has risen to a point near that of the supply source pressure, and then becoming ineffective to oppose the actuating means.

2. In combination with a reciprocating fluid operated motor having two pressure chambers effective to move an output member of the motor in opposite directions, a source of operating fluid subject to variations in pressure, direction control valve means for directing fluid from the source alternately to said chambers, said valve means including a two-way-acting pressure responsive reversing means having relatively opposed pressure chambers continuously connected in parallel with respective motor pressure chambers whereby a predetermined pressure rise in the then effective motor pressure chamber acts on the pressure responsive means of the valve means in a direction tending to cause reverse of the then operating fluid connections to the motor chambers, and a pressure responsive device continuously connected during operation of the motor for operation by fluid whose pressure varies with the pressure of said source, said device being arranged to restrain and prevent operation of the reversing means until the pressure being applied to operate said motor rises to a predetermined fraction of the then existing pressure of said source, the device then permitting operation of the reversing means.

3. In combination with a reciprocating fluid operated motor having alternately acting pressure chambers and a movable output member arranged for limited stroke action, a source of pressure fluid subject to variation, direction control valve means for alternately directing fluid from the source to said chambers, pressure responsive spring loaded over-center or toggle action fluid-path-reversing mechanism including a reversing piston connected to operate the valve means and having opposed pressure chambers exposed alternately by operation of the valve means to fluid communicating with respective motor pressure chambers in such manner that a predetermined pressure rise in each motor pressure chamber such as occurs at the end of a motor output member stroke, acts on the reversing piston and valve means in a direction tending to cause reverse of the then operating fluid connections to the motor chambers, and a pair of balancing pistons each continuously exposed to fluid pressure of said source on one side while being exposed on its opposite side by operation of the valve means either to motor operating fluid pressure or negligible pressure, the balancing pistons being thereby operated into blocking relationship to movements of the reversing piston, hence movements of the toggle mechanism past dead center in either direction, until the pressure being applied to operate said fluid operated motor rises to a predetermined fraction of the pressure of said source, the balancing pistons then permitting over-center operation of the toggle mechanism.

4. A hydraulic wiper motor control mechanism for aircraft having hydraulic system supply pressure which varies in accordance with characteristically different operations of the craft, said mechanism including a reciprocating hydraulic motor and an automatic reversing or motor-operation-direction-determining valve mechanism which includes spring loaded, over center type, toggle means, motor-operating-pressure-responsive actuator means connected for operation of the toggle means past center in relatively opposite directions, and pressure responsive means connected to oppose and prevent operation of the reversing valve mechanism by the actuator means as a function of existing aircraft system supply pressure until and only until the motor-operating pressure rises to a point near the then effective system supply pressure.

5. In combination with a reciprocating fluid operated motor having alternately acting pressure chambers and a movable output member having normally limited strokes, a source of pressure fluid, and direction control valve means for alternately directing fluid from the source to said chambers, pressure responsive reversing means connected to operate the valve means by fluid communicating with respective motor pressure chambers, whereby a predetermined pressure rise in each motor pressure chamber acts on the pressure responsive means of the valve means in a direction tending to cause reverse of the then operating fluid connections to the motor chambers, and a pressure responsive device continuously exposed during operation of the motor substantially to the pressure of said source and being operatively connected to the reversing means in a manner to restrain operation of the reversing means to reverse the fluid connections until the pressure being applied to operate the motor rises to a predetermined fraction of the pressure of said source, the device then permitting operation of the reversing means.

6. The combination according to claim 5, wherein the reversing means comprises a piston exposed alternately at its opposite ends to motor operating pressure, and the pressure responsive device comprises two free pistons and motion limiting guides therefore operatingly aligned with the reversing means piston for enabling the free pistons to abut axial surface portions of the reversing means piston and thereby restrain its movement in opposite directions, the free pistons each being exposed alternately on one axial face to motor operating pressure and at all times on its opposite face, and differentially, to supply system pressure.

7. In the combination according to claim 5, a master control and metering valve connected with said source and having separate outlets leading to the direction control valve means and said pressure responsive device, the master control valve when opened from closed position being constrained first to connect fluid of said source to the pressure responsive device and thereafter to connect fluid of said source to the direction control valve means.

8. In combination with a reciprocating hydraulic motor adapted for automatic operation by fluid from a supply system whose output pressure is subject to variation, the motor having an automatic spring loaded reversing or motor-operation-direction-determining valve mechanism, motor-operating-pressure-responsive actuator means connected for operation of the valve mechanism in relatively opposite directions, and means responsive solely to system supply pressure and having means acting upon and capable of limiting movement of the actuator means to less than is required to effect reversal of the valve mechanism until the motor-operating pressure rises to a point near the then effective system supply pressure, and then becoming ineffective to limit such movement of the actuator means.

References Cited in the file of this patent

UNITED STATES PATENTS

| | | |
|---|---|---|
| 829,504 | Carter | Aug. 28, 1906 |
| 1,019,074 | Newhouse | Mar. 5, 1912 |
| 2,302,232 | MacNeil | Nov. 17, 1942 |
| 2,698,517 | Witt | Jan. 4, 1955 |
| 2,829,626 | West | Apr. 8, 1958 |

FOREIGN PATENTS

| | | |
|---|---|---|
| 140,528 | Sweden | May 26, 1953 |
| 511,512 | Canada | Mar. 22, 1955 |